US007210019B2

(12) United States Patent
Corrado (10) Patent No.: US 7,210,019 B2
(45) Date of Patent: Apr. 24, 2007

(54) EXCLUSIVE ACCESS FOR LOGICAL BLOCKS

(75) Inventor: Francis R. Corrado, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 10/794,619

(22) Filed: Mar. 5, 2004

(65) Prior Publication Data

US 2005/0198447 A1  Sep. 8, 2005

(51) Int. Cl.
*G06F 12/00* (2006.01)
(52) U.S. Cl. .................. 711/208; 711/209; 707/100
(58) Field of Classification Search .............. 711/163, 711/208, 209, 100
See application file for complete search history.

(56) References Cited

U.S. PATENT DOCUMENTS

| 5,504,858 | A  | * | 4/1996 | Ellis et al. ................. 714/6 |
| 6,411,957 | B1 | * | 6/2002 | Dijkstra .................. 707/100 |
| 6,578,067 | B1 | * | 6/2003 | Okazaki et al. ............ 709/203 |
| 6,711,595 | B1 | * | 3/2004 | Anantharao ............... 707/206 |
| 2004/0103105 | A1 | * | 5/2004 | Lindblad et al. ........... 707/100 |
| 2005/0108730 | A1 |   | 5/2005 | Nemiroff et al. |

OTHER PUBLICATIONS

Leon, James F. "Tree Structures", http://www.cs.niu.edu/~t90jfl1/notes/tree3.htm, Feb. 25, 1999., pp. 1-6.☐☐*
Fr, Alex. "Interprocess Communication Tutorial", The Code Project, Oct. 8, 2001, pp. 1-13.*
Set of Algorithms for Performing Logical Operations On Compressed Bitmaps, IBM Technical Disclosure Bulletin, vol. 32, pp. 184-189, Mar. 1990.*
Bubble Memory Binary Search Tree, IBM Technical Disclosure Bulletin, vol. 25, pp. 2624-2627, Oct. 1982.*
Bubble Structure and Operation to Facilitate Tree Traversal, IBM Technical Disclosure Bulletin, vol. 26, pp. 4766-4777, Feb. 1984.*
SOM-based R-tree for similarity retrieval by Sun-Seok Oh et al., Dept. of Intelligent Systems, Kyushu University, Fukuoka, Jap, Proc. Database Systems for Advanced Applications, pp. 182-189, (Apr. 2001).*

* cited by examiner

*Primary Examiner*—Pierre-Michel Bataille
(74) *Attorney, Agent, or Firm*—Rabindranath Dutta; Konrad Raynes & Victor LLP (57) ABSTRACT

In certain embodiments, a plurality of nodes of a hierarchical data structure are generated, wherein each node of the hierarchical data structure represents a set of at least one locked logical block. A request is received to exclusively access a set of at least one logical block. A determination is made, by traversing at least one node of the hierarchical data structure, whether the set of at least one logical block overlaps sets of at least one locked logical block represented by the plurality of nodes of the hierarchical data structure.

21 Claims, 7 Drawing Sheets

EXCLUSIVE ACCESS FOR LOGICAL BLOCKS

BACKGROUND

1. Field

The disclosure relates to exclusive access for logical blocks.

2. Background

A computational device may have one or more storage volumes coupled to the computational device. Applications implemented in the computational device may represent the storage volumes as a plurality of logical blocks, where a logical block address may be used to address a logical block. Certain operations, such as, write operations, may require exclusive access to one or more logical blocks. Logical blocks may have to be locked for the duration in which the logical blocks are exclusively accessed.

In certain systems, the locking of logical blocks may be based on uniformly sized subsets of the storage volumes, such as, data stripes. For example, a storage volume may be divided into a plurality of subsets, where each subset is 64 Kilobytes in size, i.e., the granularity of locking is 64 Kilobytes. In such a case, 64 Kilobytes of storage needs to be locked even if exclusive access is required for only one logical block whose total size is 512 bytes.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide exclusive access to variable sized segments of a storage volume by first acquiring a lock for a specific range of logical block addresses to be reserved and then releasing the lock when the lock is no longer required. The ranges of logical block addresses that are locked are represented in a hierarchical data structure, such as, a balanced tree. By representing the locked ranges of logical block addresses in a hierarchical data structure, a faster search for a locked range of logical block addresses can be performed when compared to searching for the locked range of logical block addresses in a linear data structure.

Figure 1:
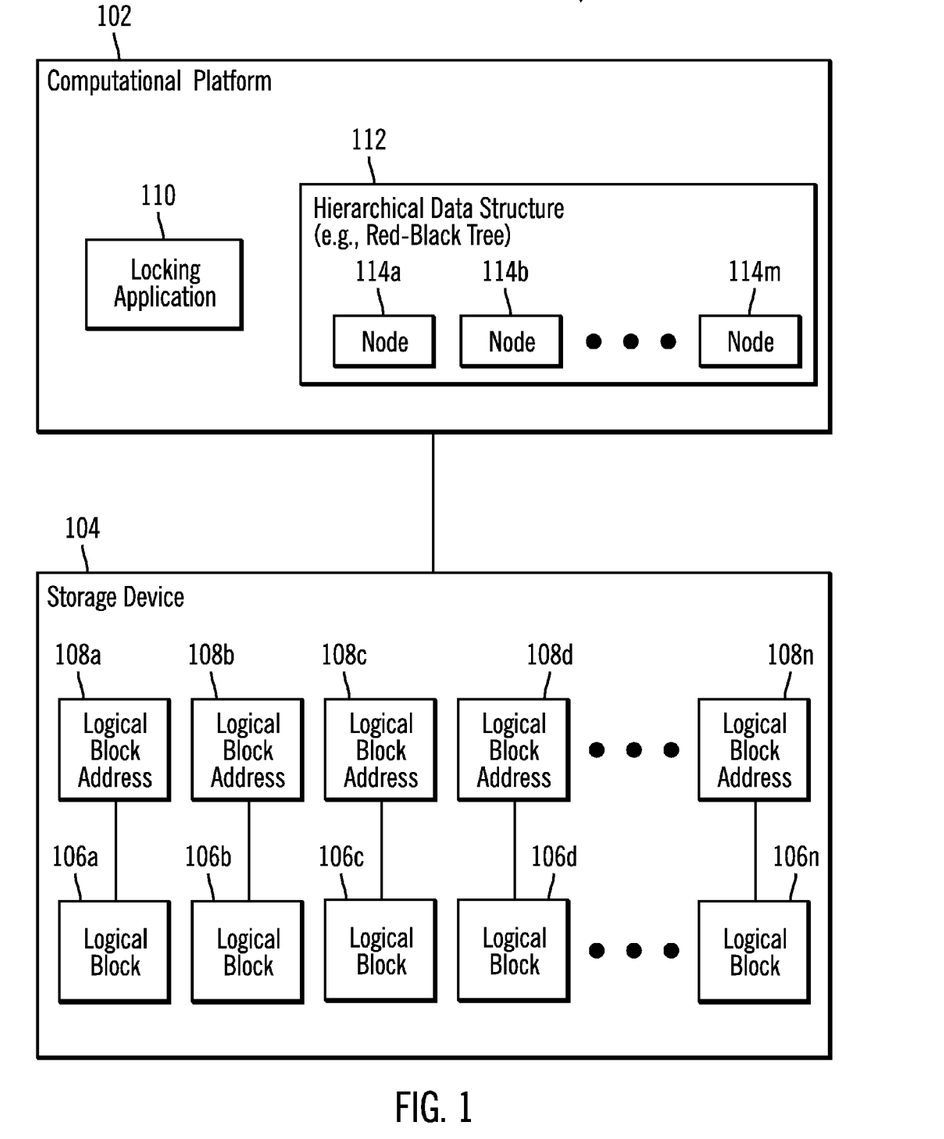
FIG. 1 illustrates a first computing environment, in accordance with certain embodiments.

FIG. 1 illustrates a first computing environment 100, in accordance with certain embodiments. A computational platform 102 is coupled to at least one storage device 104. The computational platform 102 may perform input/output (I/O) operations with respect to the storage device 104.

The computational platform 102 may be a personal computer, a workstation, a server, a mainframe, a hand held computer, a palm top computer, a laptop computer, a telephony device, a network computer, a blade computer, or any other computational platform. The storage device 104 may be based on a Redundant Array of Independent Disk (RAID) storage, a tape storage, a disk storage, CDROM storage, DVD storage, etc. In FIG. 1, the computational platform 102 is directly coupled to the storage device 104. In alternative embodiments, the computational platform 102 and the storage device 104 may be coupled via a network, such as, the Internet, an intranet, a Local area network (LAN), a Storage area network (SAN), a Wide area network (WAN), a wireless network, etc. The network may be part of one or more larger networks or may be an independent network or may be comprised of multiple interconnected networks. Furthermore, in additional embodiments, the storage device 104 may be located inside the computational platform 102.

The storage device 104 may be represented logically by a plurality of logical blocks $106a \ldots 106n$. The logical blocks $106a \ldots 106n$ may represent physical blocks of storage in the storage device 104. The logical blocks $106a \ldots 106n$ are addressed by corresponding logical block addresses $108a \ldots 108n$. For example, logical block address $108a$ may be used to access data stored in logical block $106a$, logical block address $108b$ may be used to access data stored in logical block $106b$, and logical block address $108n$ may be used to access data stored in logical block $106n$.

The computational platform 102 may include an application, such as, a locking application 110, and a data structure, such as, a hierarchical data structure 112. In certain embodiments the locking application 110 may comprise a controller software, such as, a RAID controller software. The locking application 110 may be capable of accessing the logical blocks $106a \ldots 106n$ via the corresponding logical block addresses $108a \ldots 108n$. The locking application 110 may also be capable of locking one or more of the logical blocks $106a \ldots 106n$. The locking application may be further capable of releasing a logical block $106a \ldots 106n$ that has been locked.

In certain embodiments, the locking application 110 can use a range of logical block addresses to lock a range of logical blocks. For example, the locking application 110 may specify that that logical blocks corresponding to a range of logical block addresses $108a \ldots 108b$ are to be locked. In such a case, the logical blocks $106a$, $106b$ are locked for providing exclusive access to certain processes or operations initiated in the computing environment 100.

The hierarchical data structure 112 may store the ranges of logical block addresses in a plurality of nodes $114a \ldots 114m$. A node may be a unit of reference in a data structure. In certain additional embodiments a node may be a collection of information. In certain embodiments, the nodes $114a \ldots 114m$ store ranges of logical block addresses that are locked by the locking application 110. The plurality of nodes $114a \ldots 114m$ may be arranged hierarchically in the form of a balanced tree, such as, a red-black tree, where a tree is a hierarchical data structure that may be accessed by starting at the root node that is a distinguished initial or fundamental node of the tree. Each node of the tree is either a leaf or an internal node. An internal node has one or more child nodes and is called the parent of the one or more child nodes. The root may be depicted at the top of the hierarchical structure, and the leaves may be depicted at the bottom. The maximum distance of any leaf from the root of a tree is the height of the tree. A balanced tree may be a tree whose subtrees differ in height by no more than one, where the subtrees are also height balanced. A red-black tree may be a balanced tree that uses extra information per node to maintain balance. In a red-black tree no leaf is more than twice as far from the root as any other leaf. A red-black tree with n internal nodes has a height that is at most $2 \log_2(n+1)$. A red-black tree may also be defined as a balanced binary search tree where the height of the two subtrees of a node differs by at most one. Look-up, insertion, and deletion in a red-black tree can be performed in a time that is of the order of $\log_2(n)$ where n is the number of nodes in the tree.

The first computing environment 100 illustrates certain embodiments in which the locking application 110 stores ranges logical block addresses in the hierarchical data structure 112. In certain embodiments the ranges of logical block addresses are stored in a red-black tree, where the look-up, insertion and deletion of the ranges of logical block addresses can be performed in a time that is of the order of $\log_2(n)$ where n is the number of nodes in the red-black tree.

Figure 2:
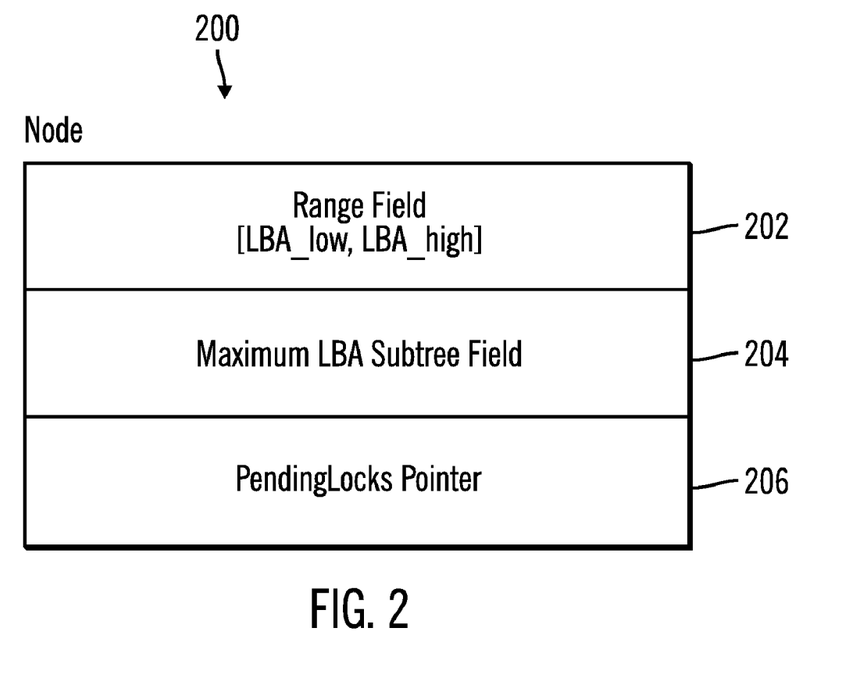
FIG. 2 illustrates a block diagram a node of a hierarchical data structure implemented in the first computing environment, in accordance with certain embodiments.

FIG. 2 illustrates a block diagram a node 200 of the hierarchical data structure 112 implemented in the first computing environment 100, in accordance with certain embodiments.

The node 200 includes a range field 202, a maximum LBA subtree field 204 and a pending locks pointer 206. The range field 202 indicates the range of logical block address to be locked and can be represented as [LBA_low, LBA_high] where LBA_low<=LBA_high and the logical blocks that range from logical block address LBA_low to logical block address LBA_high are locked by the locking application 110.

The maximum LBA subtree field 204 is the maximum logical block address in the subtree rooted at node 200. The pending locks pointer 206 may be a pointer to a queue of pending logical block address lock requests that overlap the range of logical blocks locked by the range field 202.

Figure 3:
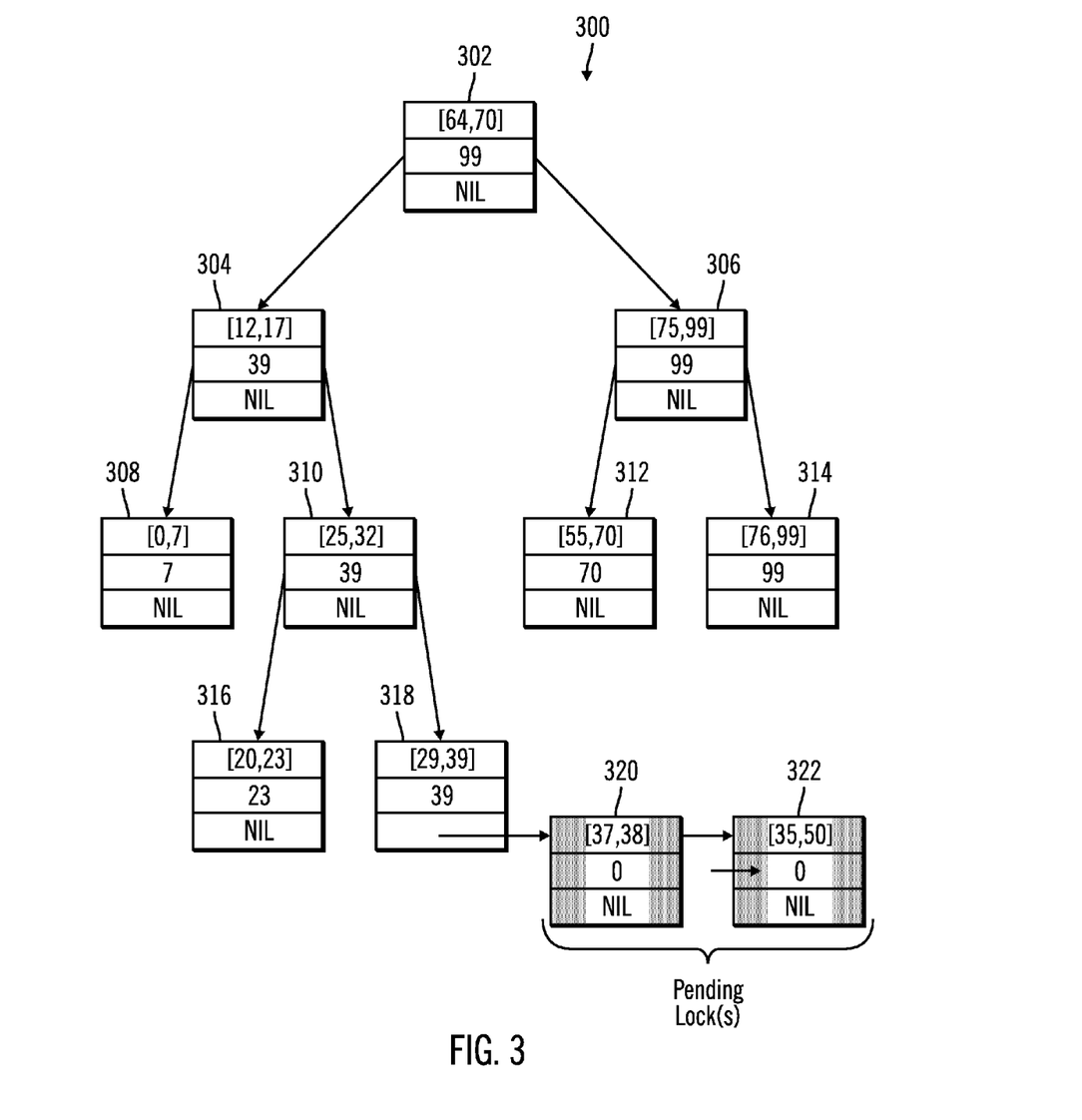
FIG. 3 illustrates a block diagram of exemplary nodes in a first red-black tree, in accordance with certain embodiments.

FIG. 3 illustrates a block diagram of exemplary nodes in a first red-black tree 300, in accordance with certain embodiments. Each node of the first red-black tree 300 also includes a color field (RED or BLACK) and left, right, and parent pointers that are not shown, in order to simplify the block diagram. The nodes of the first red-black tree 300 have fields corresponding to node 200.

The first red-black tree 300 includes 9 held locks (depicted by reference numerals 302, 304, 306, 308, 310, 312, 314, 316, 318) with two pending requests (depicted by reference numerals 320, 322) to acquire locks whose logical block address ranges overlap the lock for logical block addresses [29,39], where the two pending requests are pointed to by the pending locks pointer of node 318.

The first red-black tree 300 makes it possible to search for a locked range of logical blocks in a time that is of the order of $\log_2(n)$ where n is the number of nodes in the red-black tree 300. For example, if a request comes in for locking a range of logical block addresses [39,42] then the locking application 110 traverses the nodes 302, 304, 310, 318 and attaches another pending request to the pending locks pointer of node 318 because the range of logical block addresses [39,42] overlaps the range of logical block addresses locked by node 318. In the red-black tree 300 the left subtree of a node locks logical block addresses that are lower than the logical block addresses locked by the node, and the right subtree of the node locks logical block addresses that are greater than the logical block address locked by the node. Therefore, during traversal of the red-black tree 300 the locking application 110 can follow either the left subtree of a node or the right subtree of the node as required. The locking application 110 is not required to follow both subtrees of a node while traversing the red-black tree 300.

Figure 4:
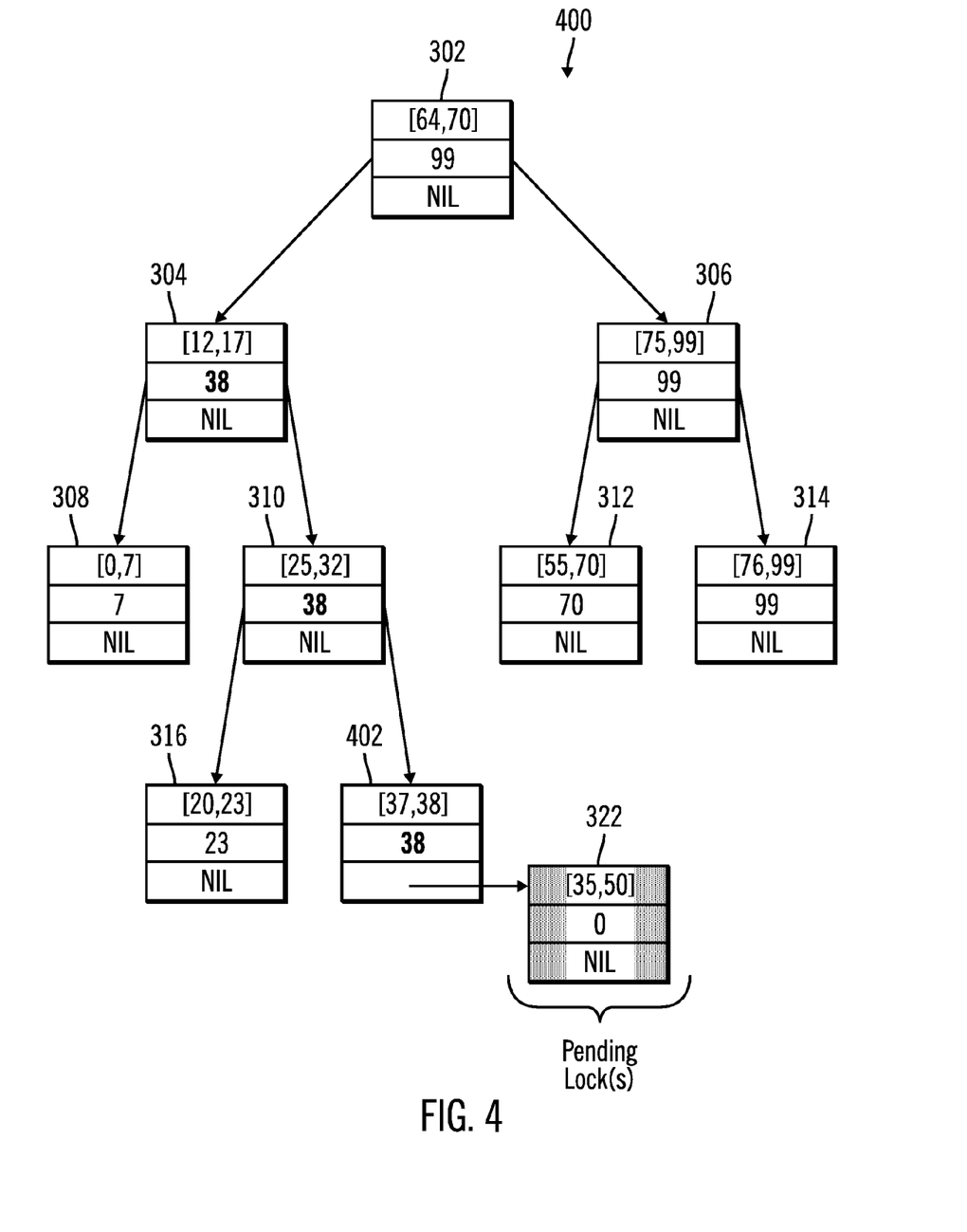
FIG. 4 illustrates a block diagram of exemplary nodes in a second red-black tree, in response to a release of a node in the first red-black tree, in accordance with certain embodiments.

FIG. 4 illustrates a block diagram of exemplary nodes in a second red-black tree 400, in response to a release of a lock in the first red-black tree 300 of FIG. 3, in accordance with certain embodiments.

In certain embodiments, a node, such as node 318 may be deleted by the locking application 110 after the range of logical addresses that are locked via node 318 are no longer required to be locked. In response to deleting node 318, the locking application 110 may rearrange the first red-black tree 300, such that the pending request 320 becomes the node 402 of the second red-black tree 400, where the second red-black tree 400 is the rearranged first red-black tree 300. In FIG. 4, the Maximum LBA Subtree field 204 for nodes 304, 310, and 402 is 38 after the rearrangement of the first red-black tree 300.

During the course of insertions and deletions of nodes in the red-black trees 300, 400, the nodes may be rearranged, such that, after the insertions and deletions are completed the hierarchical data structure 112 is still a red-black tree. By maintaining the hierarchical data structure 112 as a red-black tree, insertions, deletions, and search in the tree can be performed in a time that is of the order of $\log_2(n)$ where n is the number of nodes in the tree.

Figure 5:
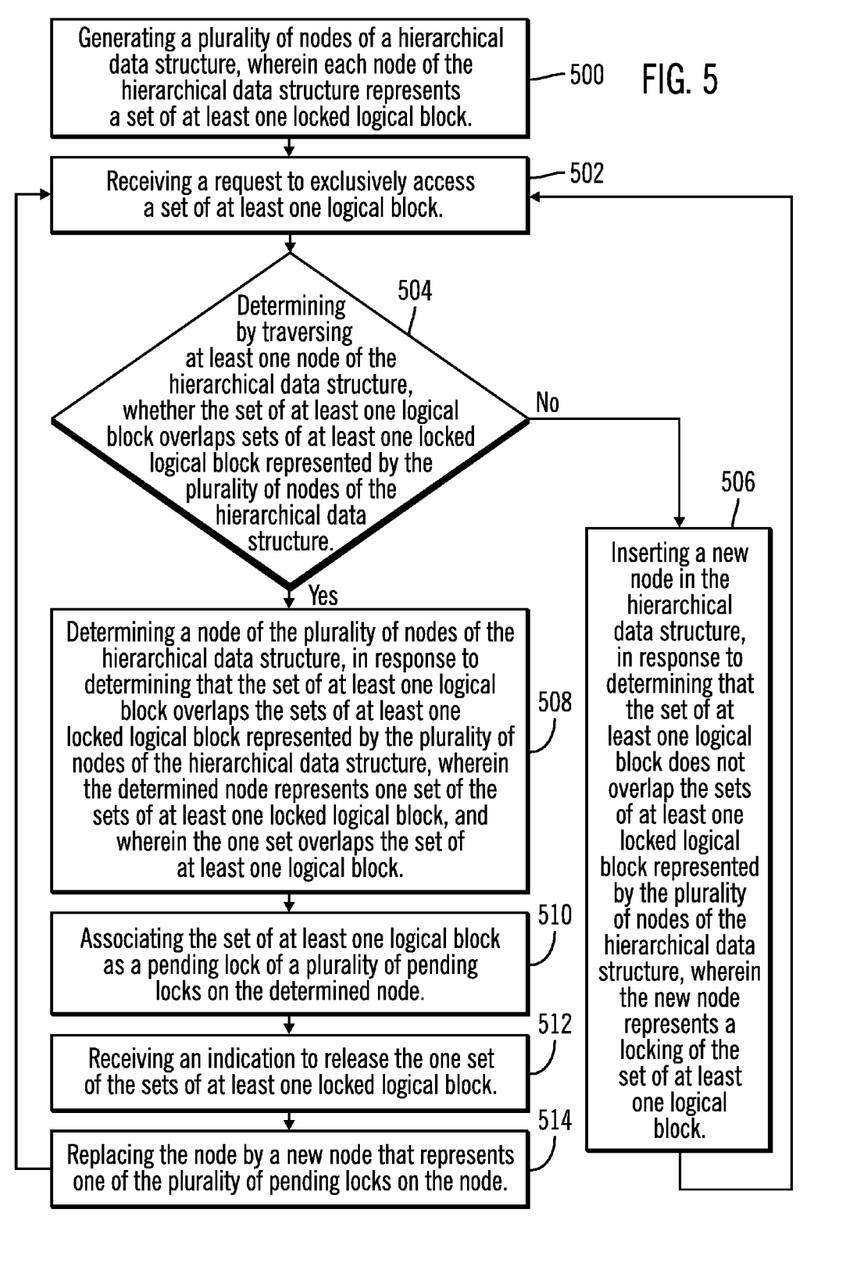
FIG. 5 illustrates operations implemented in an application that is capable executing in the first computing environment.

FIG. 5 illustrates operations implemented by the locking application 110 that is capable of executing in the computing environment 100 of FIG. 1.

Control starts at block 500, where the locking application 110 generates a plurality of nodes 114a . . . 114m of the hierarchical data structure 112, wherein each node of the hierarchical data structure 112 represents a set of at least one locked logical block. For example, in certain embodiments node 114a may represent a set comprising logical blocks 106a, 106b where the logical blocks 106a, 106b are locked logical blocks. In certain embodiments, the range field 202 of a node represents the locked logical blocks as logical block addresses 108a, 108b in the form [108a,108b].

The locking application 110 receives (at block 502) a request to exclusively access a set of at least one logical block. For example, in certain embodiments, the locking application 110 may receive a request from some other application, where the request is for exclusively accessing the set of logical blocks 106c, 106d. In certain embodiments, the set of logical blocks 106c, 106d may be represented by corresponding logical block addresses in the form [108c, 108d].

The locking application 110 determines (at block 504), by traversing at least one node of the hierarchical data structure 112, whether the set of at least one logical block overlaps sets of at least one locked logical block represented by the plurality of nodes of the hierarchical data structure 112. For example, in certain embodiments the locking application 110 may determine whether logical blocks in the range [13,17] overlaps the logical blocks locked by the nodes 302, 304, 306, 308, 310, 312, 314, 316, 318 of the red-black tree 300.

If the locking application 110 determines (at block 504) that the set of at least one logical block does not overlap the sets of at least one locked logical block represented by the plurality of nodes of the hierarchical data structure 112, then the locking application 110 inserts (at block 506) a new node in the hierarchical data structure 112, wherein the new node represents a locking of the set of at least one logical block. For example, in certain embodiments, a new node with range field [71,74] may be inserted into the red-black tree 300. In certain embodiments, the new node can cause a rearrangement of the plurality of nodes of the hierarchical data structure 112. For example, in certain embodiments, the nodes of the red-black tree 300 may need to be rearranged, such that, the red-black tree 300 is maintained as a red-black tree after the insertion of the new node. After inserting (at block 506) the new node, control may return to block 502 where a next request to exclusively access a set of at least one logical block is received.

If the locking application 110 determines (at block 504) that the set of at least one logical block overlaps the sets of at least one locked logical block represented by the plurality of nodes of the hierarchical data structure, then the locking application 110 determines (at block 508) a node of the plurality of nodes of the hierarchical data structure, wherein the determined node represents one set of the sets of at least one locked logical block, and wherein the one set overlaps the set of at least one logical block. For example, in certain embodiments the locking application 110 may determine node 318 of the red-black tree 300, if a lock is requested for logical addresses denoted by [37,38].

The locking application 110 associates (at block 510) the set of at least one logical block as a pending lock of a plurality of pending locks on the determined node. For example, in certain embodiments, the set of at least one logical block addresses denoted by [37,38] may be associated as the pending lock 320 to the node 318 in the red-black tree 300.

The locking application 110 receives (at block 512) an indication to release the one set of the sets of at least one locked logical block. For example, in certain embodiments the locking application 110 may receive an indication to release the node 318 of the red-black tree 300.

The locking application 110 replaces (at block 514) the released node by a new node that represents one of the plurality of pending locks on the node. For example, in certain embodiments, on releasing node 318 in the red-black tree 300, the locking application 110 may replace the node 318 by node 402 that represents the pending lock 320 in the red-black tree 300 and form a new red-black tree 400. After replacing at block 514) the node, control may return to block 502 where a next request to exclusively access a set of at least one logical block is received.

In certain embodiments, the hierarchical data structure 112 is a balanced tree. Additionally in certain embodiments, the balanced tree is a red-black tree, wherein each node of the red-black tree comprises a first indicator that indicates a range of logical block addresses corresponding to the set of at least one logical block, a second indicator that indicates a highest logical block address locked by a right subtree, and a third indicator that indicates whether there are pending locks. For example, in certain embodiments, hierarchical data structure 112 may be the red-black tree 300 and the first indicator may be the range field 202 of a node, the second indicator may be the maximum LBA subtree 204 of a node, and the third indicator may be the pending locks pointer 206 of a node.

In certain embodiments generating, receiving, and determining are performed by the locking application 110 in the computational platform 102, wherein the at least one logical block is a logical representation of storage coupled to the computational device. For example, in certain embodiments, the logical blocks may represent storage in the storage device 104 that is coupled to the computational platform 102.

In certain embodiments, search, insertion and deletion of logical block addresses in the hierarchical data structure 112 can be performed in a time that is of the order of $\log_2(n)$, wherein n is a number of the plurality of nodes in the hierarchical data structure 112. Therefore, exclusive access for logical blocks can be ensured in a time that is of the order of $\log_2(n)$, wherein n is a number of the plurality of nodes in the hierarchical data structure 112.

Figure 6:
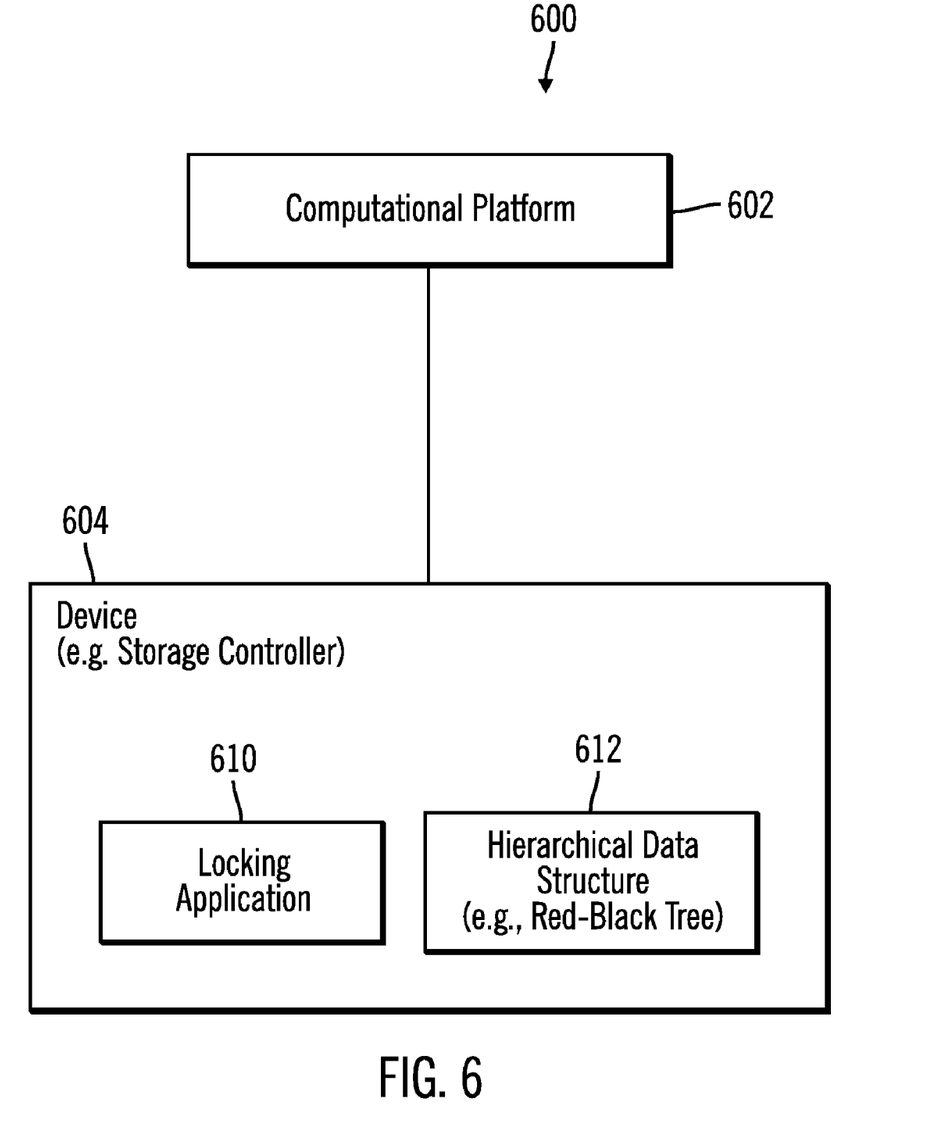
FIG. 6 illustrates a second computing environment, in accordance with certain embodiments.

FIG. 6 illustrates a second computing environment 600, in accordance with certain embodiments. In the computing environment 600, a computational platform 602 is coupled to a device 604, such as, a storage controller. In certain embodiments, a locking application 610 and a hierarchical data structure 612 may be implemented in software, firmware, hardware or any combination thereof in the device 604. The locking application 610 can perform operations similar to operations performed by the locking application 110 implemented in the computational platform 102. The hierarchical data structure 612 may be structured similarly to the hierarchical data structure 110. The operations illustrated in FIG. 5 also can be performed by the locking application 610 implemented in the device 604. In certain embodiments, the device 604 is a storage controller, such as, a RAID controller, and the locking application 610 and the hierarchical data structure 612 are implemented in hardware, firmware, software, or any combination thereof, in the RAID controller. In certain alternative embodiments, the device 604 may be inside the computational platform 602.

Certain embodiments can provide a mechanism for enforcing exclusive access to variable segments of a RAID volume as small as a single disk sector. To provide exclusive access to a range of sectors in the RAID volume, a RAID controller software that implements the locking application 110, 610 can first acquire a lock for the specific range of logical block addresses to be reserved, and then release the lock when the locks are no longer needed. The lock may be referred to an LBA lock and the hierarchical data structure 610, 612 that stores the LBA lock may be referred to as a LBA lockset. The range of logical block addresses denoted by [LBA_high, LBA_low] is a closed interval that is the LBA lock's key for searching the LBA lockset.

In order to acquire a new LBA lock, the LBA lockset may be searched. If no overlap with any other LBA lock in the LBA lockset is found, the new LBA lock is added to the lockset. If an overlap occurs, the new LBA lock is added to a pending locks queue of the overlapped LBA lock. When the overlapped LBA lock is released, the released lock is removed form the lockset and an attempt is made to reacquire any locks that are pending on the released LBA lock.

Certain embodiments provide the ability to lock out or protect variable sized segments of storage volumes with granularity as small as a single disk sector. Certain embodiments may be used to handle parity updates for write requests by locking only those parity blocks that will be updated by the write, without locking access to an entire stripe, thus allowing more concurrent write requests to be processed.

Certain embodiments may also be used to implement an efficient RAID volume data cache, where each LBA lock represents the subset of the RAID volume currently in cache. Certain embodiments may also be used to implement locking for online RAID level migration to prevent concurrent access by host I/O requests and the migration process.

In certain embodiments, additional color fields of the nodes of the hierarchical data structure 112 may be used to keep the hierarchical data structure 112 balanced and to perform left and right rotations around selected nodes as necessary. The expected and worse case running time for searching an LBA lockset containing "n" LBA locks is of the order of $\log_2(n)$.

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed. Furthermore, program logic that includes code may be implemented in hardware, software, firmware or many combination thereof.

Figure 7:
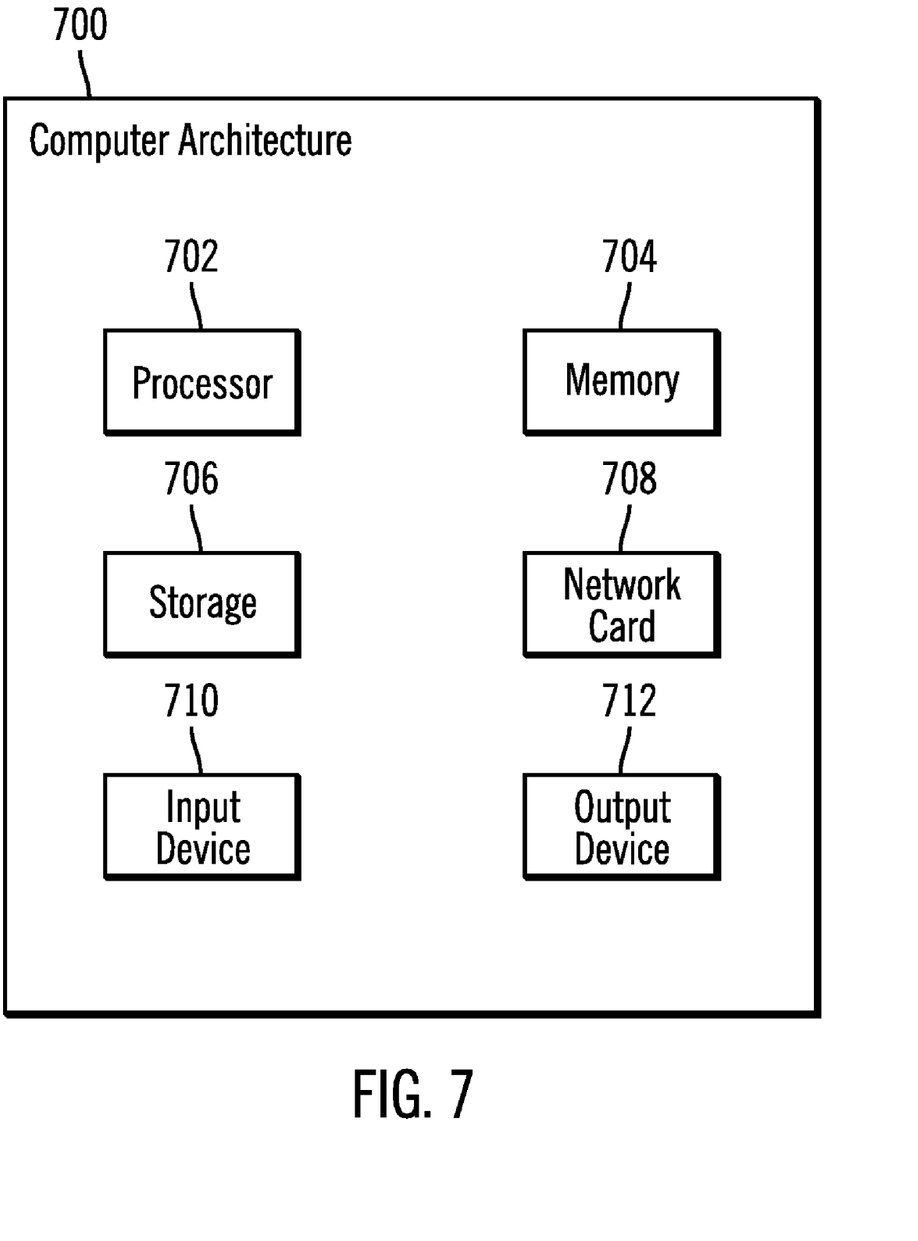
FIG. 7 illustrates a block diagram of a computer architecture for certain elements of the first and second computer environments, in accordance with certain embodiments.

FIG. 7 illustrates a block diagram of a computer architecture in which certain embodiments are implemented. FIG. 7 illustrates one embodiment of the computational platforms 102, 602, and the device 604. The computational platforms 102, 602 and the device 604 may implement a computer architecture 700 having a processor 702, a memory 704 (e.g., a volatile memory device), and storage 706. Not all elements of the computer architecture 700 may be found in the computational platforms 102, 602 and the device 606. The storage 706 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 706 may comprise an internal storage device, an attached storage device and/or a network accessible storage device. Programs in the storage 706 may be loaded into the memory 704 and executed by the processor 702 in a manner known in the art. The architecture may further include a network card 708 to enable communication with a network. The architecture may also include at least one input device 710, such as a keyboard, a touchscreen, a pen, voice-activated input, etc., and at least one output device 712, such as a display device, a speaker, a printer, etc.

Certain embodiments may be implemented in a computer system including a video controller to render information to display on a monitor coupled to the computer system including the device 604, where the computer system may comprise a desktop, workstation, server, mainframe, laptop, handheld computer, etc. An operating system may be capable of execution by the computer system, and the video controller may render graphics output via interactions with the operating system. Alternatively, some embodiments may be implemented in a computer system that does not include a video controller, such as a switch, router, etc. Furthermore, in certain embodiments the device may be included in a card coupled to a computer system or on a motherboard of a computer system.

At least certain of the operations of FIG. 5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1–7 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A system, comprising:
   a processing unit; and
   program logic including code capable of causing the processing unit to perform:
   (i) generating a plurality of nodes of a hierarchical data structure, wherein each node of the hierarchical data structure is capable of representing a set of at least one locked logical block;
   (ii) receiving a request to exclusively access a set of at least one logical block; and
   (iii) determining, by traversing at least one node of the hierarchical data structure, whether the set of at least one logical block overlaps sets of at least one locked logical block represented by the plurality of nodes of the hierarchical data structure, wherein the hierarchical data structure is a balanced tree, wherein the balanced tree is a red-black tree, and wherein each node of the red-black tree comprises a first indicator that indicates a range of logical block addresses corresponding to the set of at least one logical block, a second indicator that indicates a highest logical block address locked by both left and right subtrees, and a third indicator that indicates whether there are pending locks.

2. The system of claim 1, wherein the program logic is further capable of causing the processing unit to perform:

inserting a new node in the hierarchical data structure, in response to determining that the set of at least one logical block does not overlap the sets of at least one locked logical block represented by the plurality of nodes of the hierarchical data structure, wherein the new node is capable of representing a locking of the set of at least one logical block.

3. The system of claim 2, wherein inserting the new node can cause a rearrangement of the plurality of nodes of the hierarchical data structure.

4. The system of claim 1, wherein the program logic is further capable of causing the processing unit to perform:
determining a node of the plurality of nodes of the hierarchical data structure, in response to determining that the set of at least one logical block overlaps the sets of at least one locked logical block represented by the plurality of nodes of the hierarchical data structure, wherein the determined node is capable of representing one set of the sets of at least one locked logical block, and wherein the one set is capable of overlapping the set of at least one logical block; and
associating the set of at least one logical block as a pending lock of a plurality of pending locks on the determined node.

5. The system of claim 4, wherein the program logic is further capable of causing the processing unit to perform:
receiving an indication to release the one set of the sets of at least one locked logical block; and
replacing the node by a new node is capable of representing one of the plurality of pending locks on the node.

6. The system of claim 1, wherein search, insertion and deletion of logical block addresses in the hierarchical data structure can be performed in a time that is of the order of $\log_2(n)$, wherein n is a number of the plurality of nodes in the hierarchical data structure.

7. The system of claim 1, further comprising:
a plurality of storage volumes, wherein the program logic is capable of controlling the plurality of storage volumes, and wherein the plurality of storage volumes are capable of being represented by logical blocks.

8. A method, comprising:
generating a plurality of nodes of a hierarchical data structure, wherein each node of the hierarchical data structure represents a set of at least one locked logical block;
receiving a request to exclusively access a set of at least one logical block; and
determining, by traversing at least one node of the hierarchical data structure, whether the set of at least one logical block overlaps sets of at least one locked logical block represented by the plurality of nodes of the hierarchical data structure, wherein the hierarchical data structure is a balanced tree, wherein the balanced tree is a red-black tree, and wherein each node of the red-black tree comprises a first indicator that indicates a range of logical block addresses corresponding to the set of at least one logical block, a second indicator that indicates a highest logical block address locked by both left and right subtrees, and a third indicator that indicates whether there are pending locks.

9. The method of claim 8, further comprising:
inserting a new node in the hierarchical data structure, in response to determining that the set of at least one logical block does not overlap the sets of at least one locked logical block represented by the plurality of nodes of the hierarchical data structure, wherein the new node represents a locking of the set of at least one logical block.

10. The method of claim 9, wherein inserting the new node can cause a rearrangement of the plurality of nodes of the hierarchical data structure.

11. The method of claim 8, further comprising:
determining a node of the plurality of nodes of the hierarchical data structure, in response to determining that the set of at least one logical block overlaps the sets of at least one locked logical block represented by the plurality of nodes of the hierarchical data structure, wherein the determined node represents one set of the sets of at least one locked logical block, and wherein the one set overlaps the set of at least one logical block; and
associating the set of at least one logical block as a pending lock of a plurality of pending locks on the determined node.

12. The method of claim 11, further comprising:
receiving an indication to release the one set of the sets of at least one locked logical block; and
replacing the node by a new node that represents one of the plurality of pending locks on the node.

13. The method of claim 8, wherein search, insertion and deletion of logical block addresses in the hierarchical data structure can be performed in a time that is of the order of $\log_2(n)$, wherein n is a number of the plurality of nodes in the hierarchical data structure.

14. The method of claim 8, wherein generating, receiving, and determining are performed by an application in a computational platform, wherein the at least one logical block is a logical representation of storage coupled to the computational platform.

15. An article of manufacture, comprising a storage medium having stored therein instructions that when executed by a machine results in the following:
generating a plurality of nodes of a hierarchical data structure, wherein each node of the hierarchical data structure represents a set of at least one locked logical block;
receiving a request to exclusively access a set of at least one logical block; and
determining, by traversing at least one node of the hierarchical data structure, whether the set of at least one logical block overlaps sets of at least one locked logical block represented by the plurality of nodes of the hierarchical data structure, wherein the hierarchical data structure is a balanced tree, wherein the balanced tree is a red-black tree, and wherein each node of the red-black tree comprises a first indicator that indicates a range of logical block addresses corresponding to the set of at least one logical block, a second indicator that indicates a highest logical block address locked by both left and right subtrees, and a third indicator that indicates whether there are pending locks.

16. The article of manufacture of claim 15, wherein the instructions when executed further results in the following:
inserting a new node in the hierarchical data structure, in response to determining that the set of at least one logical block does not overlap the sets of at least one locked logical block represented by the plurality of nodes of the hierarchical data structure, wherein the new node represents a locking of the set of at least one logical block.

17. The article of manufacture of claim 16, wherein inserting the new node can cause a rearrangement of the plurality of nodes of the hierarchical data structure.

18. The article of manufacture of claim 15, wherein the instructions when executed further results in the following:
   determining a node of the plurality of nodes of the hierarchical data structure, in response to determining that the set of at least one logical block overlaps the sets of at least one locked logical block represented by the plurality of nodes of the hierarchical data structure, wherein the determined node represents one set of the sets of at least one locked logical block, and wherein the one set overlaps the set of at least one logical block; and
   associating the set of at least one logical block as a pending lock of a plurality of pending locks on the determined node.

19. The article of manufacture of claim 18, wherein the instructions when executed further results in the following:
   receiving an indication to release the one set of the sets of at least one locked logical block; and
   replacing the node by a new node that represents one of the plurality of pending locks on the node.

20. The article of manufacture of claim 15, wherein search, insertion and deletion of logical block addresses in the hierarchical data structure can be performed in a time that is of the order of $\log_2(n)$, wherein n is a number of the plurality of nodes in the hierarchical data structure.

21. The article of manufacture of claim 15, wherein generating, receiving, and determining are capable of being performed by an application in a computational platform, wherein the at least one logical block is a logical representation of storage coupled to the computational platform.

* * * * *